United States Patent [19]

Patroni, Jr.

[11] Patent Number: 4,548,420
[45] Date of Patent: Oct. 22, 1985

[54] RECIPROCATING AND OSCILLATING DRIVE MECHANISM

[76] Inventor: Anthony F. Patroni, Jr., 9005 Amherst Ave., Margate, N.J. 08402

[21] Appl. No.: 558,290

[22] Filed: Dec. 5, 1983

[51] Int. Cl.$^4$ ............................................. B62M 1/16
[52] U.S. Cl. ................................. 280/224; 280/233; 280/234; 280/247
[58] Field of Search ............. 280/224, 225, 223, 234, 280/235, 244, 245, 246, 247, 248, 259, 233; 74/49; D12/111, 112, 113

[56] References Cited

U.S. PATENT DOCUMENTS 565,556  8/1896  Murray .............................. 280/234
4,189,166 2/1980 Lindsey ............................. 280/234

FOREIGN PATENT DOCUMENTS 427941 12/1947 Italy .................................. 280/233
299775  2/1929 United Kingdom ............. 280/248

*Primary Examiner*—Joseph F. Peters, Jr.
*Assistant Examiner*—Mitchell J. Hill
*Attorney, Agent, or Firm*—Robert K. Youtie

[57] ABSTRACT

A manual drive for a bicycle, or other usage, wherein a rotary crank is connected in driving relation with a bicycle wheel or other driven device, and a slotted block or yoke rides on a guide or pin by manual actuation, a connecting rod being connected between the yoke and crank to rotate the latter upon the yoke movement and thereby rotate the driven device.

11 Claims, 6 Drawing Figures

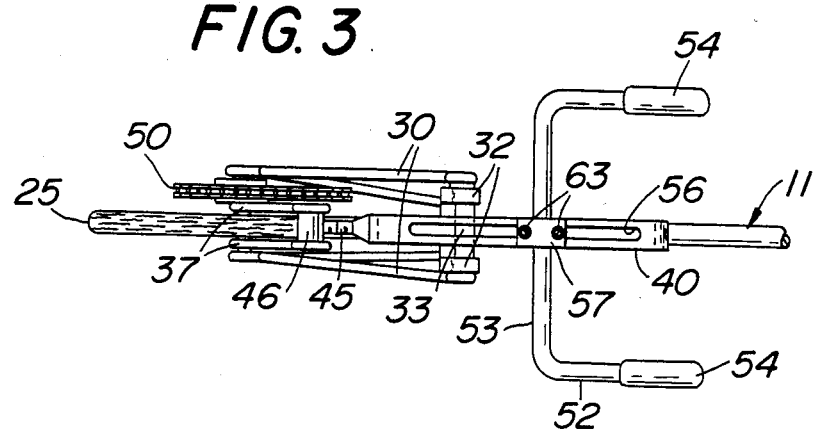
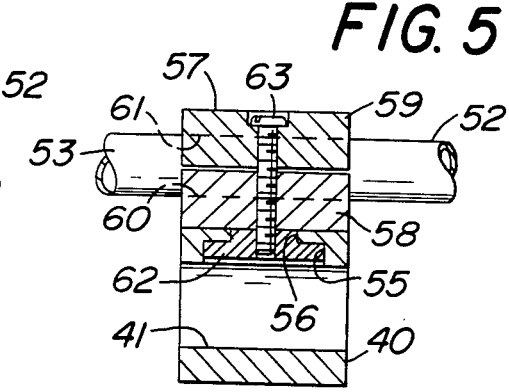
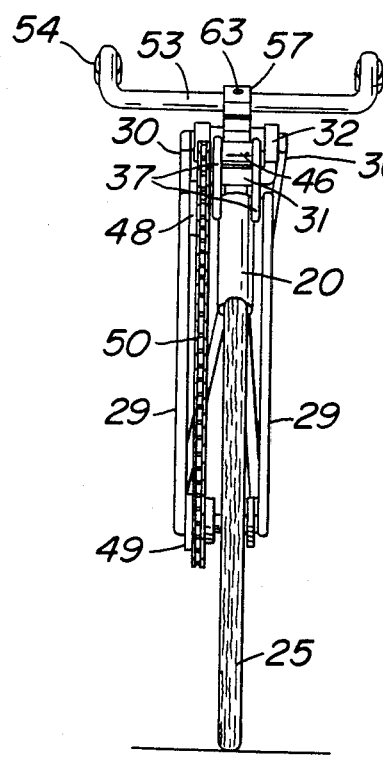
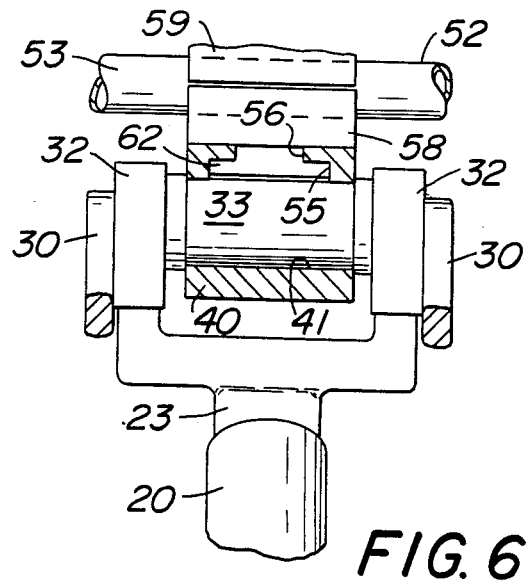

RECIPROCATING AND OSCILLATING DRIVE MECHANISM

BACKGROUND OF THE INVENTION

It is well known that bicycles are extremely popular at this time as providing healthful exercise, in addition to mere transportation. While the health benefits of bicycling are manifold, the upper body of the bicyclist, including the torso and arms, is exercised relatively little, as compared to the legs, for the time expended. Over the years there have been proposed a number of bicycles employing the concept of front wheel drive by upper body movement of the user. However, these mechanisms have not been entirely satisfactory, and have not found general acceptance, both for mechanical as well as physical exercise reasons. Applicant is aware of the prior patents listed below disclosing front wheel bicycle drive:

| U.S. PAT. NO. | PATENTEE |
| --- | --- |
| 348,325 | Hamshaw |
| 598,026 | Slippern |
| 3,921,464 | Greseth |
| 4,147,370 | Lindsey, Jr. |
| 2,225,230 | Ott |
| 2,547,600 | Saxer |
| 3,701,543 | Clark et al. |
| 4,189,166 | Lindsey |

While the device of the present invention has been primarily developed and exployed in conjunction with bicycles, and will be illustrated and described hereinafter with particular reference thereto, it is appreciated that the inventive concept is of a manual drive mechanism capable of many varied applications, all of which are intended to be comprehended herein.

SUMMARY OF THE INVENTION

It is an important object of the present invention to provide a manual drive mechanism which is relatively simple in structure for economical manufacture and reliable operation throughout a long useful life, and which requires a unique mechanical movement by the user's hands resulting in advantageous exercise of substantial musculature having beneficially healthful results.

It is a more particular object of the present invention to provide a manual drive mechanism of the type described wherein the operator's hands effect movement through a generally figure eight shaped path, resulting in healthful exercise as well as developing coordination and skill, being particularly beneficial in this regard to youngsters.

It is still another object of the present invention to provide a manual drive mechanism of the type described which can be incorporated as original equipment in bicycles and other devices, and also lends itself to quick and easy attachment as an accessory to an existing bicycle.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 3 is a top view of the device of FIG. 2.

FIG. 4 is a front elevational view of the bicycle.

FIG. 5 is a partial sectional view taken generally along the line 5—5 of FIG. 2.

FIG. 6 is a partial sectional view taken generally along the line 6—6 of FIG. 2.

DESCRIPTION OF THE PREFERRED EMBODIMENT

Figure 1:
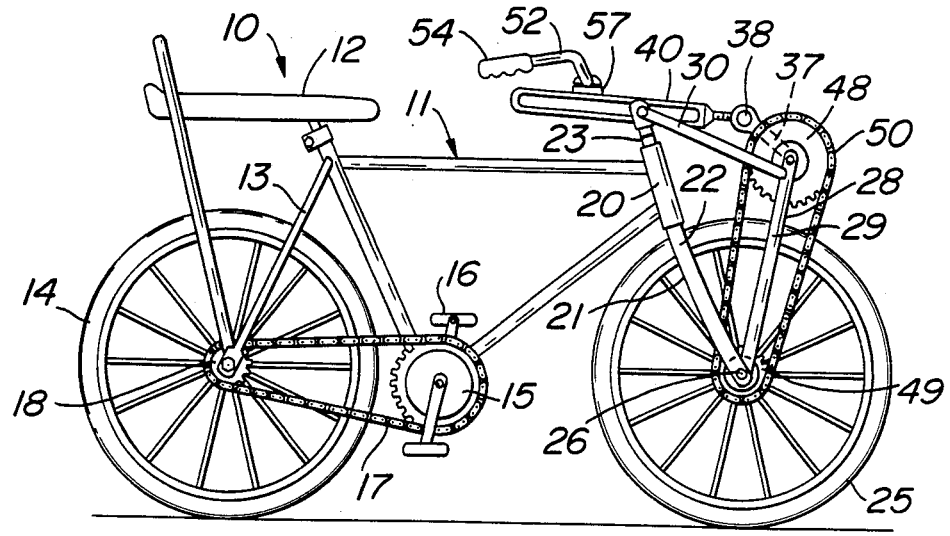
FIG. 1 is a side elevational view showing a bicycle including a manual drive mechanism constructed in accordance with the teachings of the present invention.
Figure 2:
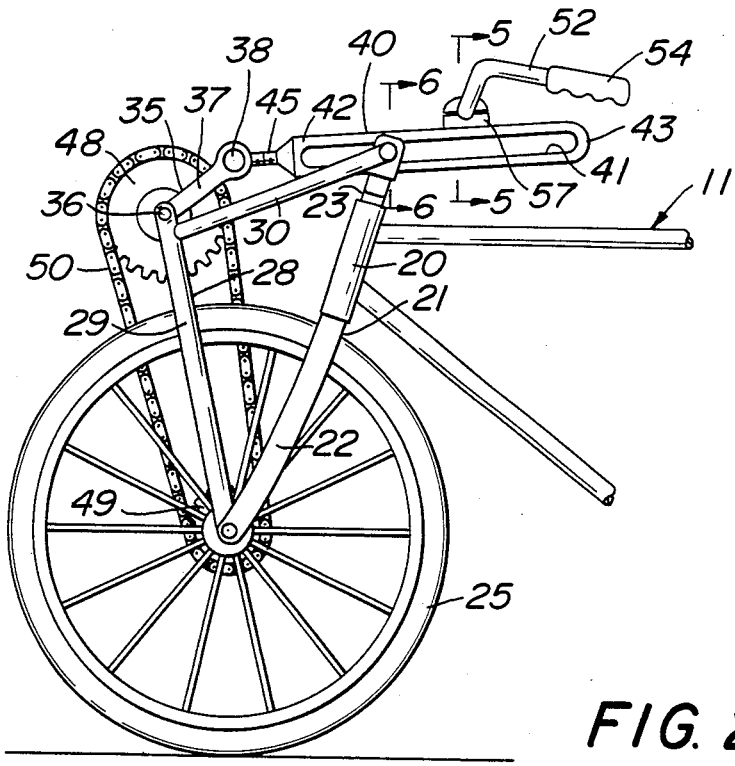
FIG. 2 is a side elevational view of the bicycle of FIG. 1, taken from the other side, and showing only the front wheel and associated manual drive mechanism.

Referring now more particularly to the drawings, and specifically to FIG. 1 thereof, a bicycle is there generally designated 10, including a forwardly and rearwardly extending frame 11 having on an upper rear frame region a seat 12. The frame 11 includes a rear wheel fork 13 depending rearwardly and downwardly from beneath the seat 12, and journaled in the rear wheel fork 13 is a rear wheel 14. A sprocket wheel 15 is journaled in a lower region of the frame 11, carrying pedal cranks 16, and connected in driving relation to the rear wheel 14, as by a sprocket chain 17 trained about the pedal sprocket wheel 15 and a rear sprocket wheel 18 rotatable with the rear wheel 14.

As thus far described, the bicycle structure is generally conventional.

The frame 11 includes at its forward end a generally upright bearing tube 20. A front wheel fork 21 extends rotatably through the bearing tube 20, having bifurcated fork legs 22 depending from the bearing tube frame part 20, and having a post 23 upstanding from and beyond the upper end of the tube 20, for a purpose appearing presently. A front wheel 25 is located between the legs 22 of fork 21 and suitably journaled therein, as by an axle 26 extending between the adjacent lower regions of fork legs 22.

A mounting structure or framework is carried by the front wheel fork 21, being generally designated 28, and includes a pair of lower links or struts 29 upstanding in parallelism with each other on opposite sides of the wheel 25 from the lower ends of respective fork legs 22, being suitably secured thereto, as by the pivot or axle 26, or otherwise. Further, the mounting structure or framework 28 includes a pair of upper struts or links 30 extending in parallelism with each other from the upper regions of respective lower struts 29 rearwardly and upwardly toward the upper region of wheel fork 22 above the bearing tube or sleeve 20.

The upstanding post 23 has fixed on its upper end a generally upright U-shaped member or clevis 31. The clevis 31 is rigid with the post 23 and wheel fork 21 for turning movement therewith, and includes upstanding legs 32 having a guide member or pin 33 extending between the upper regions of the legs. The rearward ends of struts 30 may be secured to respective clevis legs 32. Thus, the framework 28 defines with the front wheel fork 21 a pair of rigid three link trusses or frames on opposite sides of the front wheel 25.

A crank 35 is mounted between upper end regions of struts or links 29, including a pair of crank shafts or journals 36 in alignment with each other and each rotatably supported by a respective link 29. Projecting radially from each crank shaft or journal 36 is an arm 37, the arms being in spaced parallelism with each other; and, a crank or wrist pin 38 extends between the distal ends of crank arms 37 in substantial parallelism with the aligned axes of crank shaft or journals 36.

A slotted cross head, block or yoke 40 is mounted on the guide member or pin 33 for sliding and rotation relative to the guide pin. More specifically, the yoke 40 is of elongate configuration, including an elongate, longitudinally extending through slot 41 terminating adjacent to the forward and rearward yoke ends 42 and 43, respectively. The forward end 42 of the yoke 40 may be connected to the wrist pin 38 of crank 35, as by a connecting rod or elongate member 45. The elongate member or connecting rod 45 may be a threaded shank, as illustrated, threadedly engaged in and in alignment with the forward end 42 of elongate yoke 40. The other end of the connecting rod 45 may be connected to a rotary sleeve 46 freely circumposed about the wrist pin 38. The length of the connecting rod 45 is adjustable by relative rotation between the rod and the yoke 30, requiring only a partial disassembly. While the connecting rod 45 is illustrated as longitudinally aligned with yoke 40, this relationship may be angulate, or may be angularly adjustable, if desired, by any suitable means.

It will now be appreciated that the crank 35 is rotatable about the axis of its shafts or journals 36, while the yoke 40 is oscillating back and forth with a combined sliding movement relative to the pin 33 and back and forth swinging or rotative movement about the pin. Actually the yoke 40 is moving in a somewhat figure eight motion, which differs at different points of the yoke.

Carried by one of the crank shafts 36, for rotation therewith, may be a sprocket wheel 48; and, an additional sprocket wheel 49 may be carried by the axle 26 of the front wheel 25 with a sprocket chain 50 trained about the sprocket wheels 48 and 49. In this manner, the crank 35 and wheel 25 may be connected in driving-driven relation. If desired, one-way clutch means may be provided to assure rotation of the front wheel only in the forward direction of vehicle movement, clockwise in FIG. 1. Such clutch means may be associated with the sprocket wheel 49, or the sprocket wheel 48, or the wrist pin sleeve 46, as desired, and may be of conventional construction.

Manual actuating means is designated 52, and may assume the configuration of conventional bicycle handle bars, including a laterally extending medial part 53, and rearwardly extending hand grips 54 at opposite ends of the medial part 53. The handle bar 52 is mounted to the yoke 40 for selective positioning along the yoke, as best seen in FIGS. 5 and 6. It may there be observed that the upper interior surface of the slot 41 is formed with a dovetail like groove 55 having a longitudinally elongate slot or opening 56 through the upper side of the yoke 40. A two part clamp 57 seats on the upper side of the yoke 40 astride the slot 56. That is, the clamp 57 includes a lower part 58 and an upper part 59 having complementary grooves or recesses 60 and 61 for receiving and clamping the handle bar 52. A slide member 62 conformably fits into the groove 55, for movement therealong, and threaded tie members or screws 63 extend through the clamping parts 59 and 58 and threadedly into the slide member or block 62. Thus, the tie member 63 may be unthreaded or loosened to slide the clamping members 58 and 59 to a desired forward and rearward location along the yoke 40, and the handle bar 53 may be clamped at the desired yoke location, with the hand grips 54 elevated or lowered, as desired.

In operation, the clamping members 58 and 59 may be positioned to accomodate to the operator; and, the hereinbefore described figure eight movement may be simply and efficiently performed to achieve the desired exercising effect and improved skill and coordination, while the conventional leg movement is performed. The configuration of handle bar movement may vary from a figure eight at opposite ends of the yoke 40 to an elongate, generally closed configuration. If desired, the pin 33 may be axially rotatably mounted, or may support a rotary sleeve, for reducing frictional engagement with the yoke 40. While the struts or links 29 are shown connected to the axle 26, they may be directly connected to the fork legs 22 by any suitable means, if desired. This will permit adjustment of the front wheel without affecting the links 29. Of course, the front and rear wheel drives may be operated independently of each other; and, only one or the other operated if desired.

Although the present invention has been described in some detail by way of illustration and example for purposes of clarity of understanding, it is understood that certain changes and modifications may be made within the spirit of the invention.

What is claimed is:

1. A drive mechanism comprising a rotary crank shaft, a crank arm extending radially from said crank shaft, a crank pin extending from said crank arm generally parallel to said crank shaft, a guide mounted in radially spaced relation with respect to said crank shaft, a connecting rod pivotally connected at one region to said crank pin for rotation therewith, a yoke adapted to slide and oscillate with respect to said guide and secured to said connecting rod at a location spaced from said one region, and manual operating means connected to said yoke for sliding and oscillating the latter relative to said guide to rotate said crank pin and drive said crank shaft.

2. A drive mechanism according to claim 1, said guide comprising a guide pin fixed relative to the axis of said crank shaft, and said yoke having a slot extending transversely of said crank shaft and axis and receiving said guide pin for sliding and oscillating with respect to said guide pin.

3. A drive mechanism according to claim 2, in combination with angularly adjustable connecting means connecting said yoke and connecting rod for adjusting the angle of said manual operating means.

4. A drive mechanism according to claim 2, in combination with adjustable connecting means connecting said manual operating means to said yoke to accomodate to the user.

5. A drive mechanism according to claim 1, in combination with a bicycle frame, a front wheel fork rotatably connected to and depending from said frame, a handle bar post upstanding from said front wheel fork and rotatable therewith, a front wheel journaled in said front wheel fork, mounting means mounting said crank shaft with its axis fixed relative to said front wheel fork, drive means interposed in driving relation between said crank shaft and front wheel to drive the latter, and guide mounting means mounting said guide to said handle bar post for guiding said yoke.

6. A drive mechanism according to claim 5, said manual operating means comprising handle bars for steering the bicycle.

7. A drive mechanism according to claim 5, said drive means comprising sprocket wheel and chain means.

8. A drive mechanism according to claim 5, said crank shaft mounting means comprising a pair of links connected together and to said wheel fork to define a rigid three link structure.

9. A drive mechanism according to claim 8, said pair of links being connected, respectively, to upper end regions of said wheel fork.

10. A drive mechanism according to claim 1, said yoke comprising an elongate member having a longitudinal slot receiving said guide for sliding and oscillating with respect to said guide.

11. A drive mechanism according to claim 10, said connecting rod having said one region thereof and said spaced location thereof at opposite ends of said connecting rod.

* * * * *